UNITED STATES PATENT OFFICE.

DÉSIRÉ KORDA, OF PARIS, FRANCE, ASSIGNOR TO SOCIÉTÉ COMMERCIALE DES MINES, MINERAIS ET METAUX, OF PARIS, FRANCE.

PROCESS FOR THE TREATMENT OF SULFURETED COPPER-ZINC ORES IN A CONVERTER.

1,003,051.     Specification of Letters Patent.     Patented Sept. 12, 1911.

No Drawing.     Application filed August 16, 1910. Serial No. 577,497.

*To all whom it may concern:*

Be it known that I, DÉSIRÉ KORDA, engineer, a subject of Hungary, residing at Paris, France, have invented new and useful Improvements in Processes for the Treatment of Sulfureted Copper-Zinc Ores in a Converter, of which the following is a specification.

My invention relates to an improved method of treating sulfureted ores, such as copper-zinc ores, containing a high proportion of zinc.

In the methods heretofore practiced of treating such ore, difficulties in expelling the zinc have been met with, and it is the object of my invention to provide a simple method of treating such sulfid ores whereby I am enabled to obtain copper matte containing as high as 70% of copper and only 2% of zinc, the zinc in the ore being recovered in the form of 50 to 60% zinc oxid. The output of the improved method is thus approximately 93% for the copper and 60 to 70% for the zinc.

Stated in general terms the invention consists substantially in placing the ore into a converter having an interior lining formed with a high proportion of coke, and subjecting the mass to the action of compressed air; the strong reducing action of the coke lining which extends to all parts of the ore being melted, enhances the action of the coke mixed with the ore charge whereby practically all the zinc, which was heretofore dissolved in the molten mass, is expelled. Before swinging the converter in which the method is being practiced, there may be added to the mass a quantity of sulfureted ore (such as pyrites) containing as little as possible copper and zinc, this added ore immediately melting in the mass and its iron content combining with the copper to remove the latter from the slag and unite it, in the form of sulfid, to the matte thus greatly augmenting the copper production.

To enable those skilled in the art to carry out my invention the following detailed description thereof is given:—I provide an ordinary converter of the kind used for converting copper and form its interior wall with a lining containing a high proportion of coke. The lining may be formed by an intimate admixture of sixty parts of salicious sand or triturated quartz, twenty parts of pulverized metallurgical coke, and twenty parts of refractory clay used as an agglomerant for the mixture. The orifice through which the twyer passes should be provided with a lining of substantial width containing no coke, in order to avoid combustion of the latter by the injected air and rapid wear of the converter. The converter is then dried and heated as usual, and lined with incandescent coke, covering the twyers with combustible material. A few minutes blowing brings the coke to white heat. The converter is then completely filled with the ores which may be rock form, granular or in other desirable form, although it is preferable to charge the ore in the form of rock. That ore of which the pyrites is most fusible is first charged so that the operation may be quickly started, the less fusible ores following. If washed granular metallic ores having a high content of sulfur and iron are available, they are first charged. Finally a quantity of coke varying with the amount of zinc in the ores is mixed with the charge, the coke being preferably in pieces of approximately the size of a nut. The converter after being charged as described, is then first subjected to a moderate blast so that the lower parts of the mass melt and form a liquid bath in front of the twyers whereby the pressure may be progressively increased and the operation accelerated. After about an hour of this treatment the whole charge is melted into a homogeneous mass and the maximum pressure has been attained. During the melting, an energetic oxidation of the sulfur of the ores is produced and the iron is scorified by the silica of the gangue or by that of the lining. The sulfid of zinc is also roasted, then partially reduced by contact of the lower coke with that mixed with the charge and that incorporated with the lining; the zinc expelled burns in the mouth of the converter and the oxid formed is drawn away into the deposit chambers. Further treatment is however desirable as the largest part of zinc of the ores still remains in the state of silicate or oxid dissolved in the melted mass. As soon as the melting is finished, the coke which remains in the converter floats on top of the liquid bath, and being only in contact with the superficial parts of the bath offers no hindrance to the expulsion of the zinc. The coke of the lining then acts to expel the zinc which otherwise would remain dissolved in the melted mass. The maximum blast being then in operation, all the parts of the molten mass successively contact with the lining and during the time that the oxidation of the sulfur and of the iron is continued, copper matte continually increasing in richness is formed, and active corrosion of the lining is produced by the action of the zinc, the latter being expelled in the form of oxid and driven away in the deposit chambers. When the copper matte has become nearly white, that is to say when the amount is over 60% the operation is stopped.

Before swinging the converter, 5% of the sulfureted ore, such as pyrites containing as little copper and zinc as possible, is added to the mass, and said ore which melts immediately removes, by means of its iron content the copper from the slag and unites it in the form of sulfid to the matte already formed. The converter is then swung into the intermediate position and left 15 minutes for purposes of decantation. After this decantation, the slag which may be thrown out is run off and the matte produced is gathered. The oxid of zinc is recovered by condensation of the fumes, after cooling the same by circulating in a metallic pipe, or in filters of wool flannel. In said flannel filters are gathered, at the same time as the oxid of zinc, all the lead contained in the ores in the form of white carbonate or oxicarbonate, the greatest part of the arsenic in the form of arsenite and a small quantity of sulfur in the form of sulfids. As to the gold and silver that may be contained in the ores, they appear entirely in the matte, the slags and fumes containing only traces thereof.

The method above described has been carried out and produced the following results:—Yield of the ore: Cu 6.77%, Zn 16.31%, Fe 24.00%, S 23.00%, $SiO_2$ 15.00%. Yield of the products obtained: Matt: Cu 67.22% and Zn 2.36%; Slag: Cu 0.54% and Zn 4.64%; Oxid: Cu 0.10% and Zn 55.00%. The produce or output of copper is thus 93% and that of the zinc expelled is 78% which owing to some slight waste in fumes, etc., is reduced to 60-70% of the zinc, really recovered in the form of oxid.

Having now described my invention, what I claim as new and desire to secure by Letters Patent is:—

1. The herein described method of treating sulfureted ores rich in zinc, which method consists in charging a mixture of such ores and coke into a converter having an interior lining containing a high proportion of coke, and thereafter subjecting the charge in the converter to the action of compressed air, substantially as set forth.

2. The herein described method of treating sulfureted copper and zinc ores rich in zinc, which method consists in charging a mixture of such ores and pieces of coke into a converter having an interior lining containing a high proportion of coke, and thereafter subjecting the charge in the converter to the action of compressed air blasts of progressively increasing pressure, substantially as set forth.

3. The herein described method of treating sulfureted copper and zinc ores rich in zinc, which method consists in mixing said ore with coke in small pieces, melting said mixture in a converter formed with an interior lining containing a high proportion of coke, injecting compressed air into said molten metal, and prior to swinging the converter adding to the molten mass a small quantity of pyrites containing very little copper and zinc, substantially as set forth.

In testimony whereof I have signed my name to this specification in the presence of two subscribing witnesses.

DÉSIRÉ KORDA.

Witnesses:
ANTOINE LAVOIX,
DEAN B. MASON.